US005942067A

United States Patent [19]

Newman

[11] Patent Number: 5,942,067

[45] Date of Patent: Aug. 24, 1999

[54] APPARATUS AND METHOD FOR ENCODING AN ENCODER WHEEL

[75] Inventor: Benjamin Keith Newman, Lexington, Ky.

[73] Assignee: Lexmark International, Inc., Lexington, Ky.

[21] Appl. No.: 08/861,842

[22] Filed: May 22, 1997

Related U.S. Application Data

[62] Division of application No. 08/602,648, Feb. 16, 1996, Pat. No. 5,634,169.

[51] Int. Cl.$^{6}$ .................................................. B32B 31/00

[52] U.S. Cl. ...................................... 156/108; 156/DIG. 5

[58] Field of Search ............................... 156/108, DIG. 5

[56] References Cited

U.S. PATENT DOCUMENTS

| | | | |
|---|---|---|---|
| 3,047,675 | 7/1962 | Berryhill | 179/100.3 |
| 3,104,110 | 9/1963 | Cohn et al. | 274/1 |
| 4,003,258 | 1/1977 | Suzuki | 73/290 R |
| 4,072,415 | 2/1978 | Inoue et al. | 355/14 |
| 4,551,000 | 11/1985 | Kanemitsu et al. | 355/210 |
| 4,592,642 | 6/1986 | Imaizumi et al. | 355/3 DD |
| 4,668,074 | 5/1987 | Hirozane | 355/14 D |
| 4,711,561 | 12/1987 | Tsuruoka | 355/3 R |
| 4,743,936 | 5/1988 | Bares | 355/3 DD |
| 4,959,037 | 9/1990 | Garfinkel | 446/299 |
| 4,989,754 | 2/1991 | Grasso et al. | 222/39 |
| 5,036,363 | 7/1991 | Iida et al. | 355/246 |
| 5,075,724 | 12/1991 | Wada et al. | 355/203 |
| 5,099,278 | 3/1992 | Sato | 355/200 |
| 5,115,275 | 5/1992 | Suzuki | 355/245 |
| 5,184,181 | 2/1993 | Kurando et al. | 355/260 |
| 5,194,896 | 3/1993 | Buch et al. | 355/212 |
| 5,208,631 | 5/1993 | Jacobs et al. | 355/204 |
| 5,216,462 | 6/1993 | Nakajima et al. | 355/203 |
| 5,241,525 | 8/1993 | Taylor | 369/70 |
| 5,257,077 | 10/1993 | Peters, Jr. et al. | 355/260 |
| 5,287,151 | 2/1994 | Sugiyama | 355/260 |
| 5,289,242 | 2/1994 | Christensen et al. | 355/260 |
| 5,331,388 | 7/1994 | Marotta et al. | 355/260 |
| 5,349,377 | 9/1994 | Gilliland et al. | 346/153.1 |
| 5,355,199 | 10/1994 | Bray | 355/245 |
| 5,365,312 | 11/1994 | Hillmann et al. | 355/206 |
| 5,392,102 | 2/1995 | Toyoizumi et al. | 355/245 |
| 5,436,704 | 7/1995 | Moon | 355/245 |

FOREIGN PATENT DOCUMENTS

| | | | |
|---|---|---|---|
| 57-158862 | 9/1982 | Japan | G03G 15/08 |
| 58-009170 | 1/1983 | Japan | G03G 15/08 |
| 60-178474 | 9/1985 | Japan | G03G 15/08 |
| 62-86382 | 4/1987 | Japan . | |
| 01205176 | 8/1989 | Japan . | |
| 1-205176 | 8/1989 | Japan | G03G 15/00 |
| 05040371 | 2/1993 | Japan . | |
| 5-063911 | 3/1993 | Japan | H04N 1/04 |
| 07306612 | 11/1995 | Japan . | |
| 7-306612 | 11/1995 | Japan | G03G 21/00 |

*Primary Examiner*—Francis J. Lorin
*Attorney, Agent, or Firm*—John A. Brady

[57] ABSTRACT

An encoder plate, or wheel, is connected for rotation on a toner cartridge for an electrophotographic machine, wherein the encoder plate conveys cartridge characteristic information to the machine when the cartridge is installed in the machine. The encoder plate includes a plurality of openings, wherein an opened or closed status of the plurality of openings represent the cartridge characteristic information. Apparatus and method is provided to program the encoder plate by applying a material to the encoder plate to selectively cover one or more of the plurality of openings.

12 Claims, 10 Drawing Sheets

APPARATUS AND METHOD FOR ENCODING AN ENCODER WHEEL

This is a division of U.S. patent application No. 08/602,648 filed Feb. 16, 1996, now U.S. Pat. No. 5,634,169, issued May 27, 1997.

A portion of this document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to Electrophotographic (EP) machines and more particularly relates to methods and apparatus associated with replaceable supply cartridges for such machines wherein information concerning the cartridge is provided to the machine for not only increasing the efficiency of operation thereof but to permit correct operation of the machine.

2. Description of Related Art

Many Electrophotographic output device (e.g., laser printers, copiers, fax machines, etc.) manufacturers such as Lexmark International, Inc., have traditionally required information about the EP cartridge to be available to the output device such that the control of the machine can be altered to yield the best print quality and longest cartridge life.

The art is replete with devices or entry methods to inform the EP machine about specific EP cartridge characteristics. For example, in U.S. Pat. No. 5,208,631 issued on May 4, 1993, a technique to identify colorimetric properties of toner contained within a cartridge in a reproduction machine by imbedding in a PROM within the cartridge specific coordinates of a color coordinate system for mapping color data, is disclosed.

In other prior art, for example U.S. Pat. No. 5,289,242 issued on Feb. 22, 1994, there is disclosed a method and system for indicating the type of toner print cartridge which has been loaded into an EP printer. Essentially, this comprises a conductive strip mounted on the cartridge for mating with contacts in the machine when the lid or cover is closed. The sensor is a two position switch which tells the user the type of print cartridge which has been loaded into the printer. While this method is effective, the amount of information that can be provided to the machine is limited In still other prior art, such as in U.S. Pat. No. 5,365,312 issued on Nov. 15, 1994, a memory chip containing information about the current fill status or other status data is retained. The depleted status of print medium is supplied by counting consumption empirically. The average of how much toner is required for toning a charge image is multiplied by the number of revolutions of the charge image carrier or by the degree of inking of the characters via an optical sensor. In either method, the count is less than accurate and depends upon average ink coverage on the page, or alternatively, the character density which can change dramatically due to font selection. Therefore, at best, the consumption count lacks accuracy.

The literature suggests several methods for detecting toner level in a laser printer. Most of these methods detect a low toner condition or whether toner is above or below a fixed level. Few methods or apparatus effectively measure the amount of unused toner remaining. As an example, Lexmark® printers currently employ an optical technique to detect a low toner condition. This method attempts to pass a beam of light through a section of the toner reservoir onto a photo sensor. Toner blocks the beam until its level drops below a preset height.

Another common method measures the effect of toner on a rotating agitator or toner paddle which stirs and moves the toner over a sill to present it to a toner adder roll, then developer roll and ultimately the PC Drum. The paddle's axis of rotation is horizontal. As it proceeds through it's full 360 degree rotation the paddle enters and exits the toner supply. Between the point where the paddle contacts the toner surface and the point where it exits the toner, the toner resists the motion of the paddle and produces a torque load on the paddle shaft. Low toner is detected by either 1) detecting if the torque load caused by the presence of toner is below a given threshold at a fixed paddle location or 2) detecting if the surface of the toner is below a fixed height.

In either method there is a driving member supplying drive torque to a driven member (the paddle) which experiences a load torque when contacting the toner. Some degree of freedom exists for these two members to rotate independently of each other in a carefully defined manner. For the first method 1) above, with no load applied to the paddle, both members rotate together. However, when loaded the paddle lags the driving member by an angular distance that increases with increasing load. In the second method 2), the unloaded paddle leads the rotation of the driving member, under the force of a spring or gravity. When loaded (i.e., the paddle contacts the surface of the toner), the driving and driven members come back into alignment and rotate together. By measuring the relative rotational displacement of the driving and driven members (a.k.a. phase difference) at an appropriate place in the paddle's rotation, the presence of toner can be sensed.

In the prior art, this relative displacement is sensed by measuring the phase difference of two disks. The first disk is rigidly attached to a shaft that provides the driving torque for the paddle. The second disk is rigidly attached to the shaft of the paddle and in proximity to the first disk. Usually both disks have matching notches or slots in them. The alignment of the slots or notches, that is how much they overlap, indicates the phase relationship of the disks and therefore the phase of the driving and driven members.

Various art showing the above methods and variations are set forth below.

In U.S. Pat. No. 4,003,258, issued on Jan. 18, 1977to Ricoh Co., is disclosed the use of two disks to measure toner paddle location relative to the paddle drive shaft. When the paddle reaches the top of its rotation the coupling between paddle and drive shaft allows the paddle to free fall under the force of gravity until it comes to rest on the toner surface or at the bottom of its rotation. Toner low is detected if the angle through which the paddle falls is greater than a fixed amount (close to 180 degrees). A spring connects the two disks, but the spring is not used for toner detection. It is used to fling toner from the toner reservoir to the developer.

In U.S. Pat. No. 5,216,462, issued to Oki Electric Co., Jun. 1, 1993, is described a system where a spring connects two disks so that the phase separation of the disks indicates torque load on the paddle. An instability is noted in this type of system. It further describes a system similar to the Patent above where the paddle free falls from its top dead position to the surface of the toner. The position of the paddle is sensed through magnetic coupling to a lever outside of the toner reservoir. This lever activates an optical switch when the paddle is near the bottom of its rotation. A low toner indication results when the time taken for the paddle to fall from top dead center to the bottom of the reservoir, as sensed by the optical switch, is less than a given value.

In U.S. Pat. No. 4,592,642, issued on Jun. 3,1986 to Minolta Camera Co., is described a system that does not use the paddle directly to measure toner, but instead uses the motion of the paddle to lift a "float" above the surface of the toner and drop it back down on top of the toner surface. A switch is activated by the "float" when in the low toner position. If the "float" spends a substantial amount of time in the low toner position the device signals low toner. Although the patent implies that the amount of toner in the reservoir can be measured, the description indicates that it behaves in a very non-linear, almost binary way to merely detect a toner low state.

U.S. Pat. No. 4,989,754, issued on Feb. 5, 1991 to Xerox Corp., differs from the others in that there is no internal paddle to agitate or deliver toner. Instead the whole toner reservoir rotates about a horizontal axis. As the toner inside rotates with the reservoir it drags a rotatable lever along with it. When the toner level becomes low, the lever, no longer displaced from its home position by the movement of the toner, returns to its home position under the force of gravity. From this position the lever activates a switch to indicate low toner.

In still another U.S. Pat. No. 4,711,561, issued on Dec. 8, 1987 to Rank Xerox Limited, this patent describes a means of detecting when a waste toner tank is full. It employs a float that gets pushed upward by waste toner fed into the tank from the bottom. The float activates a switch when it reaches the top of the tank.

U.S. Pat. No. 5,036,363, issued on Jul. 30, 1991 to Fujitsu Limited, describes the use of a commercially available vibration sensor to detect the presence of toner at a fixed level. The patent describes a simple timing method for ignoring the effect of the sensor cleaning mechanism on the sensor output.

U.S. Pat. No. 5,349,377, issued on Sep. 20, 1994 to Xerox Corp. discloses an algorithm for calculating toner usage and hence amount of toner remaining in the reservoir by counting black pixels and weighting them for toner usage based on pixels per unit area in the pixel's neighborhood. This is unlike the inventive method and apparatus disclosed hereinafter.

SUMMARY OF THE INVENTION

The present invention is related to apparatus and method for configuring an encoder plate associated with a cartridge for an electrophotographic machine. The encoder plate conveys cartridge characteristic information to the machine when the cartridge is installed in the machine. The encoder plate has a plurality openings, wherein an opened or closed status of the plurality of openings represent the cartridge characteristic information.

One aspect of the apparatus and method of the invention includes a material, and a tool for applying the material to the encoder plate for selectively covering one or more of the plurality of openings. In preferred embodiments, the tool includes a plurality of pins for selectively mating in corresponding guide apertures located in the encoder plate. Also, preferably, the material is a decal sized to cover at least one of the plurality of openings, and the decal includes spaced apart alignment apertures therein corresponding to the corresponding guide apertures and plurality of pins.

Another aspect of the invention is directed to a method for programming the encoder plate, including the steps of providing a plurality of guide apertures in the encoder plate, providing a tool having a plurality of pins for selectively mating in corresponding guide apertures in the encoder plate, loading the tool with a material, engaging the plurality of pins of the tool in the corresponding guide apertures in the encoder plate, and manipulating the tool to apply the material to the encoder plate for selectively covering one or more of the plurality of openings.

Other features and advantages of the invention may be determined from the drawings and detailed description of the invention that follows.

DESCRIPTION OF THE ILLUSTRATIVE EMBODIMENTS

Figure 1:
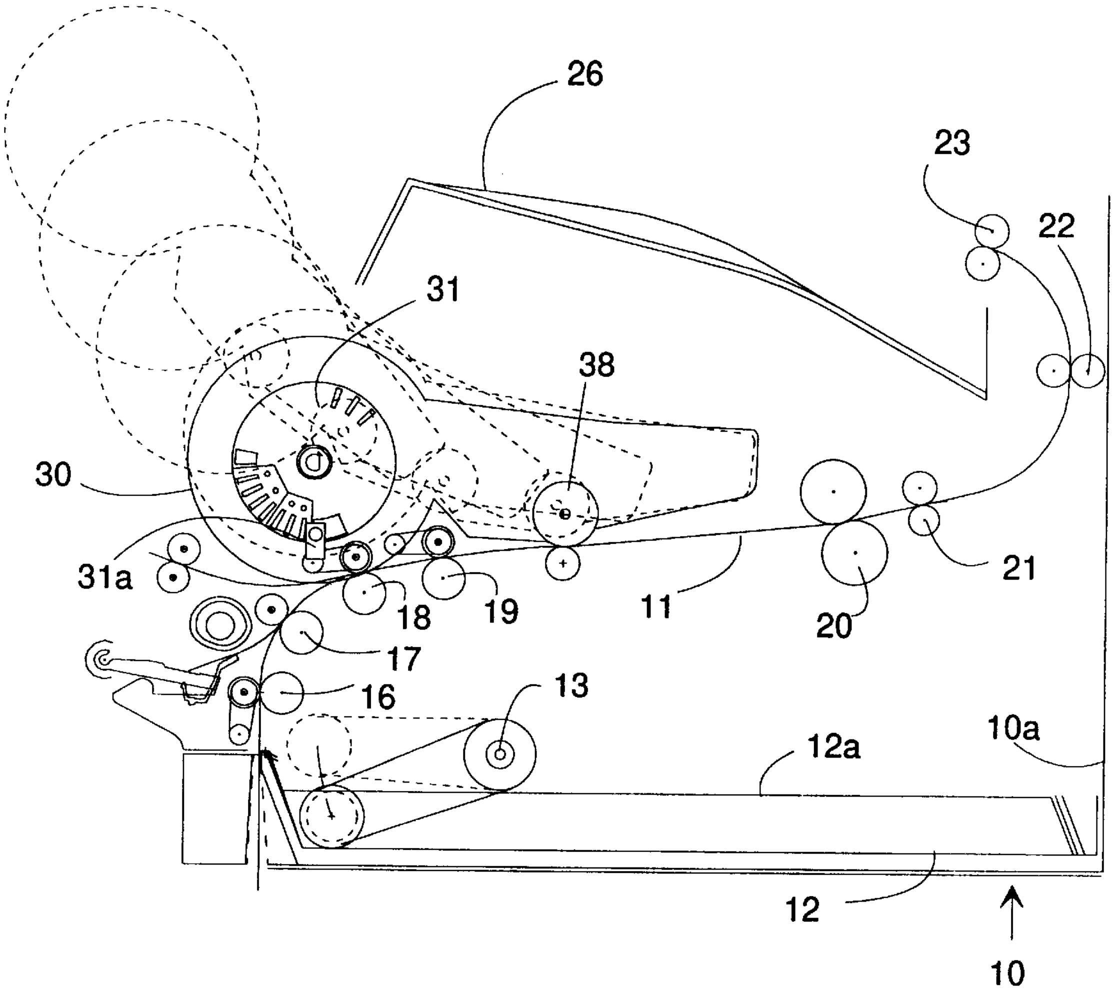
FIG. 1 is a schematic side elevational view illustrating the paper path in a typical electrophotographic machine, in the illustrated instance a printer, and showing a replacement supply EP cartridge, constructed in accordance with the present invention, and the manner of insertion thereof into the machine.

Turning now to the drawings, and particularly FIG. 1 thereof, a laser printer 10 constructed in accordance with the present invention, is illustrated therein. FIG. 1 shows a schematic side elevational view of the printer 10, illustrating the print receiving media path 11 and including a replacement supply electrophotographic (EP) cartridge 30, constructed in accordance with the present invention. As illustrated, the machine 10 includes a casing or housing 10*a* which supports at least one media supply tray 12, which by way of a picker arm 13, feeds cut sheets of print receiving media 12*a* (e.g., paper) into the media path 11, past the print engine which forms in the present instance part of the cartridge 30, and through the machine 10. A transport motor drive assembly 15 (FIG. 3) affords the driving action for feeding the media through and between the nips of pinch roller pairs 16–23 into a media receiving output tray 26.

Figure 2:
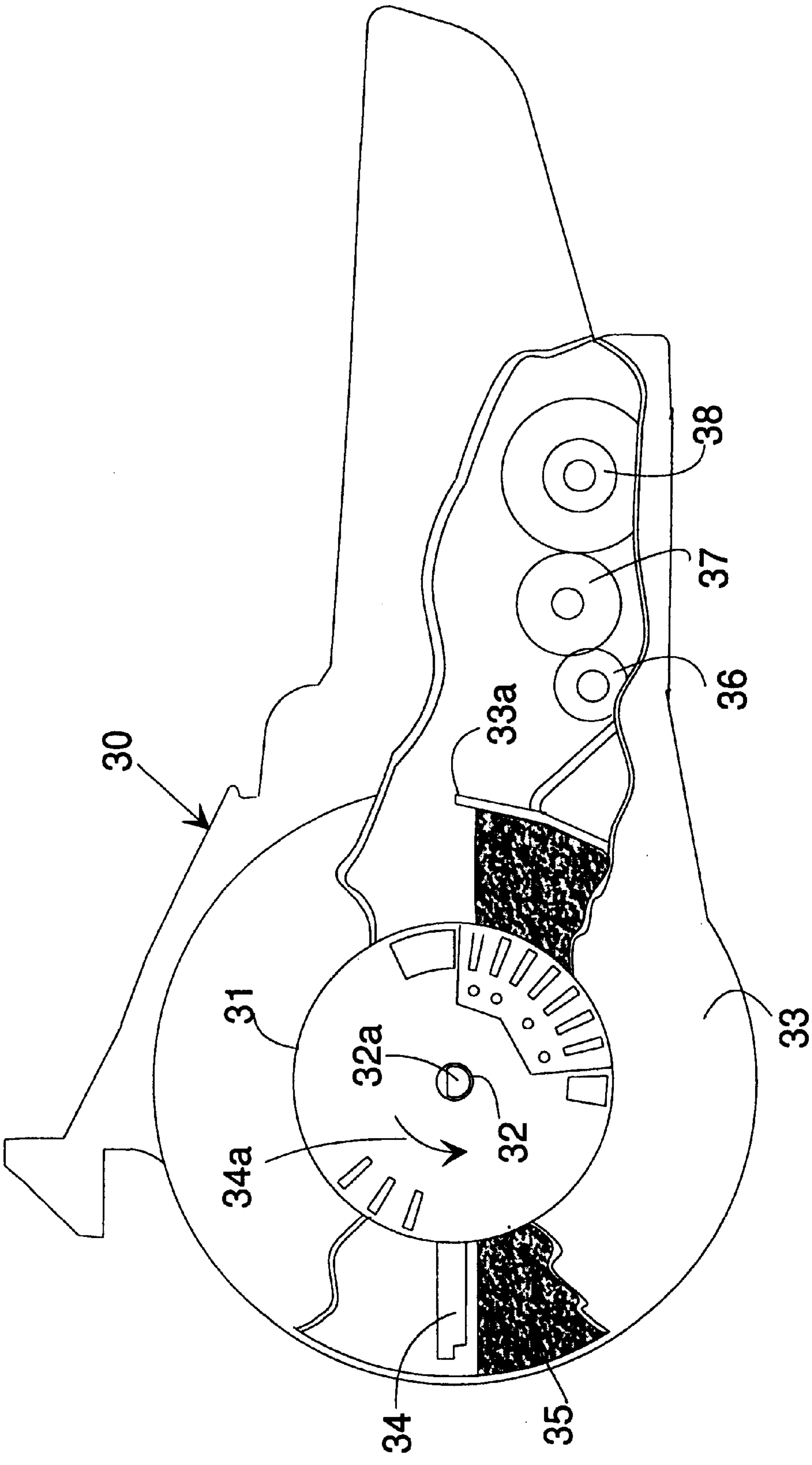
FIG. 2 is a fragmentary, enlarged, simplified, side elevational view of the cartridge illustrated in FIG. 1, and removed from the machine of FIG. 1.
Figure 3:
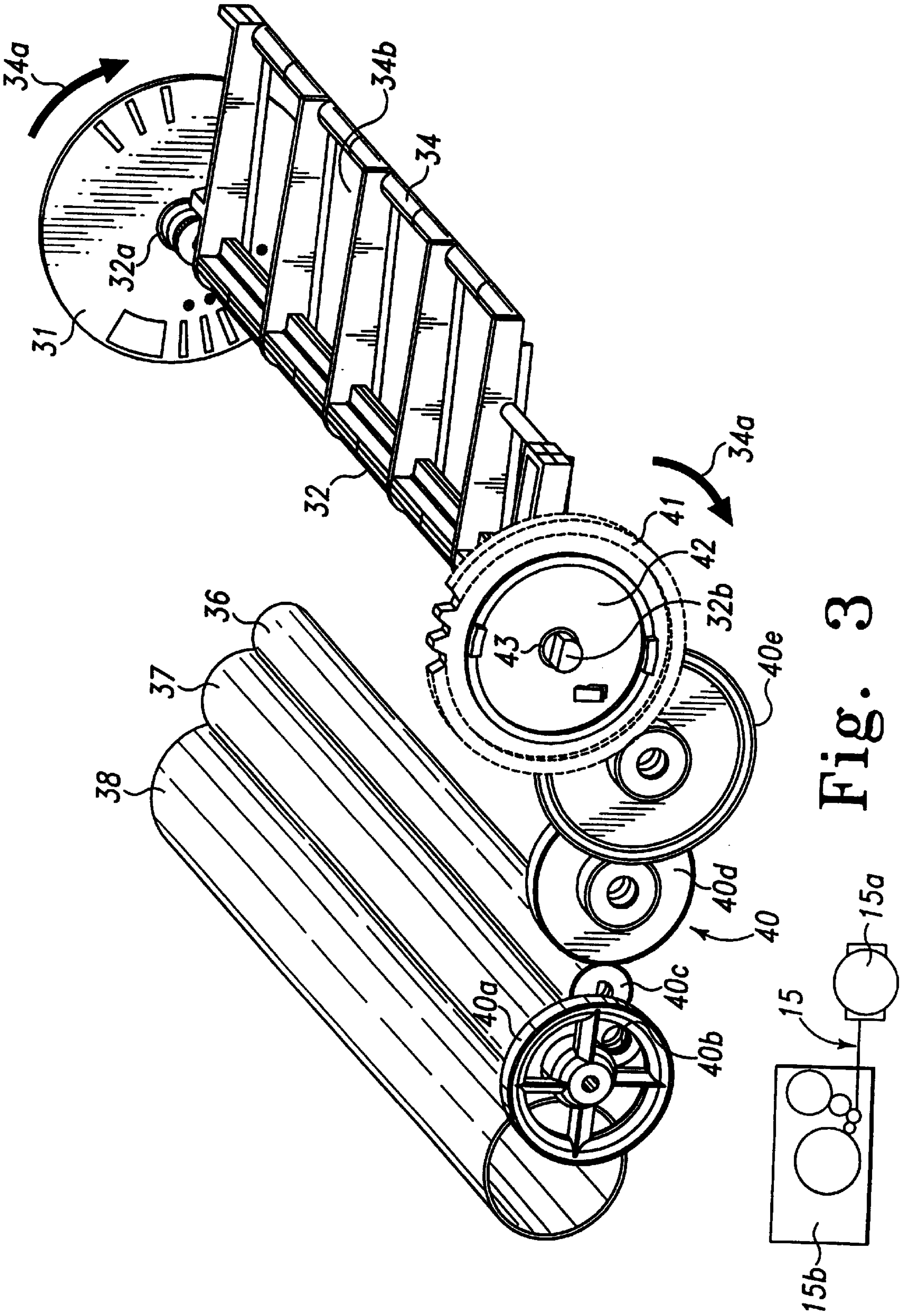
FIG. 3 is a fragmentary perspective view of the interior driven parts of the EP cartridge illustrated in FIGS. 1 and 2, including the encoder wheel and its relative position with regard to the drive mechanism for the cartridge interior driven parts.

In accordance with the invention, and referring now to FIGS. 1 and 2, the cartridge 30 includes an encoder wheel 31 adapted for coaction, when the cartridge 30 is nested in its home position within the machine 10, with an encoder wheel sensor or reader 31*a* for conveying or transmitting to the machine 10 information concerning cartridge characteristics including continuing data (while the machine is running) concerning the amount of toner remaining within the cartridge and/or preselected cartridge characteristics, such as for example, cartridge type or size, toner capacity, toner type, photoconductive drum type, etc. To this end, the encoder wheel 31 is mounted, in the illustrated instance on one end 32*a* of a shaft 32, which shaft is coaxially mounted for rotation within a cylindrical toner supply sump 33. Mounted on the shaft 32 for synchronous rotation with the encoder wheel 31, extending radially from the shaft 32 and axially along the sump 33 is a toner agitator or paddle 34. The toner 35 level for a cartridge (depending upon capacity) is generally as shown extending from approximately the 9:00 position and then counter clockwise to the 3:00 position. As the paddle 34 rotates counter clockwise in the direction of the arrow 34*a*, toner tends to be moved over the sill 33*a* of the sump 33. (The paddle 34 is conventionally provided with large openings 34*b*, FIG. 3, to provide lower resistance thereto as it passes through the toner 35.) As best shown in FIGS. 2 and 3, the toner that is moved over the sill 33*a*, is presented to a toner adder roll 36, which interacts in a known manner with a developer roll 37 and then a photo conductive (PC) drum 38 which is in the media path 11 for applying text and graphical information to the print receiving media 12*a* presented thereto in the media path 11.

Referring now to FIG. 3, the motor transport assembly 15 includes a drive motor 15*a*, which is coupled through suitable gearing and drive take-offs 15*b* to provide multiple and differing drive rotations to, for example, the PC drum 38 and a drive train 40 for the developer roll 37, the toner adder roll 36 and through a variable torque arrangement, to one end 32*b* of the shaft 32. The drive motor 15*a* may be of any convenient type, e.g., a stepping motor or in the preferred embodiment a brushless DC motor. While any of several types of motors may be employed for the drive, including stepping motors, a brushless DC motor is ideal because of the availability of either hall effect or frequency generated feedback pulses which present measurable and finite increments of movement of the motor shaft. The feedback accounts for a predetermined distance measurement, which will be referred to as an increment rather than a 'step' so as not to limit the drive to a stepping motor.

The drive train 40, which in the present instance forms part of the cartridge 30, includes driven gear 40*a*, which is directly coupled to the developer roll 37, and through an idler gear 40*b* is coupled to the toner adder roll 36 by gear 40*c*. Gear 40*c* in turn through suitable reduction gears 40*d* and 40*e* drives final drive gear 41. In a manner more fully explained below with reference to FIGS. 5 and 6, the drive gear 41 is coupled to the end 32*b* of shaft 32 through a variable torque sensitive coupling.

Figure 4:
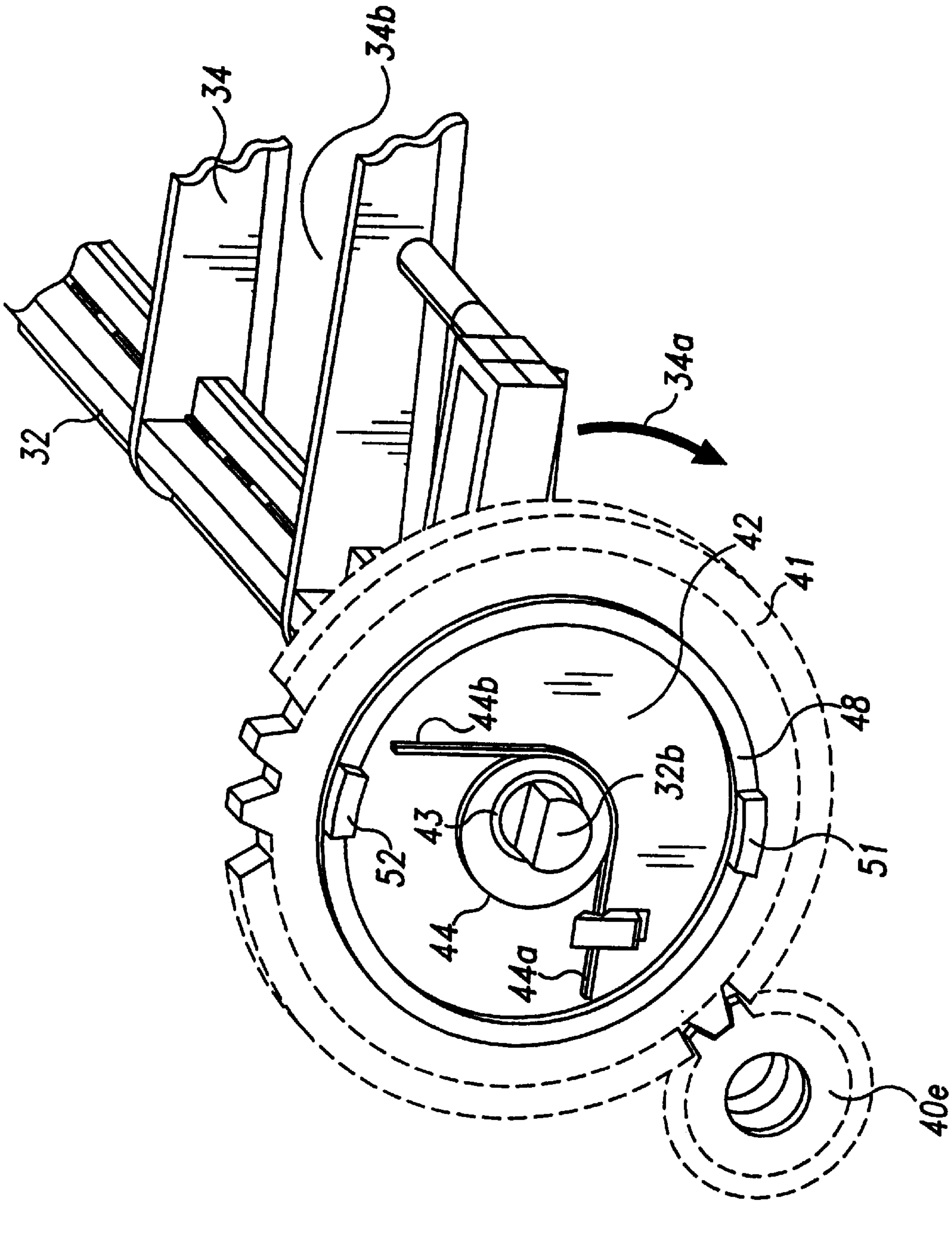
FIG. 4 is an enlarged fragmentary perspective view of the agitator/paddle drive for the toner sump, and illustrating a portion of the torque sensitive coupling between the drive gear and the driven shaft for the agitator/paddle.

In FIG. 3, the gear 41 is shown as including an attached web or flange 42 connected to a collar 43 which acts as a bearing permitting, absent restraint, free movement of the gear 41 and its' web 42 about the end 32*b* of the shaft 32. Referring now to FIG. 4, the driving half of the variable torque sensitive coupling is mounted on the web 42 of the gear 41. To this end, the driving half of the coupling includes a coiled torsion spring 44, one leg 44*a* of which is secured to the web 42 of the gear 41, the other leg 44*b* of which is free standing.

Figure 5A:
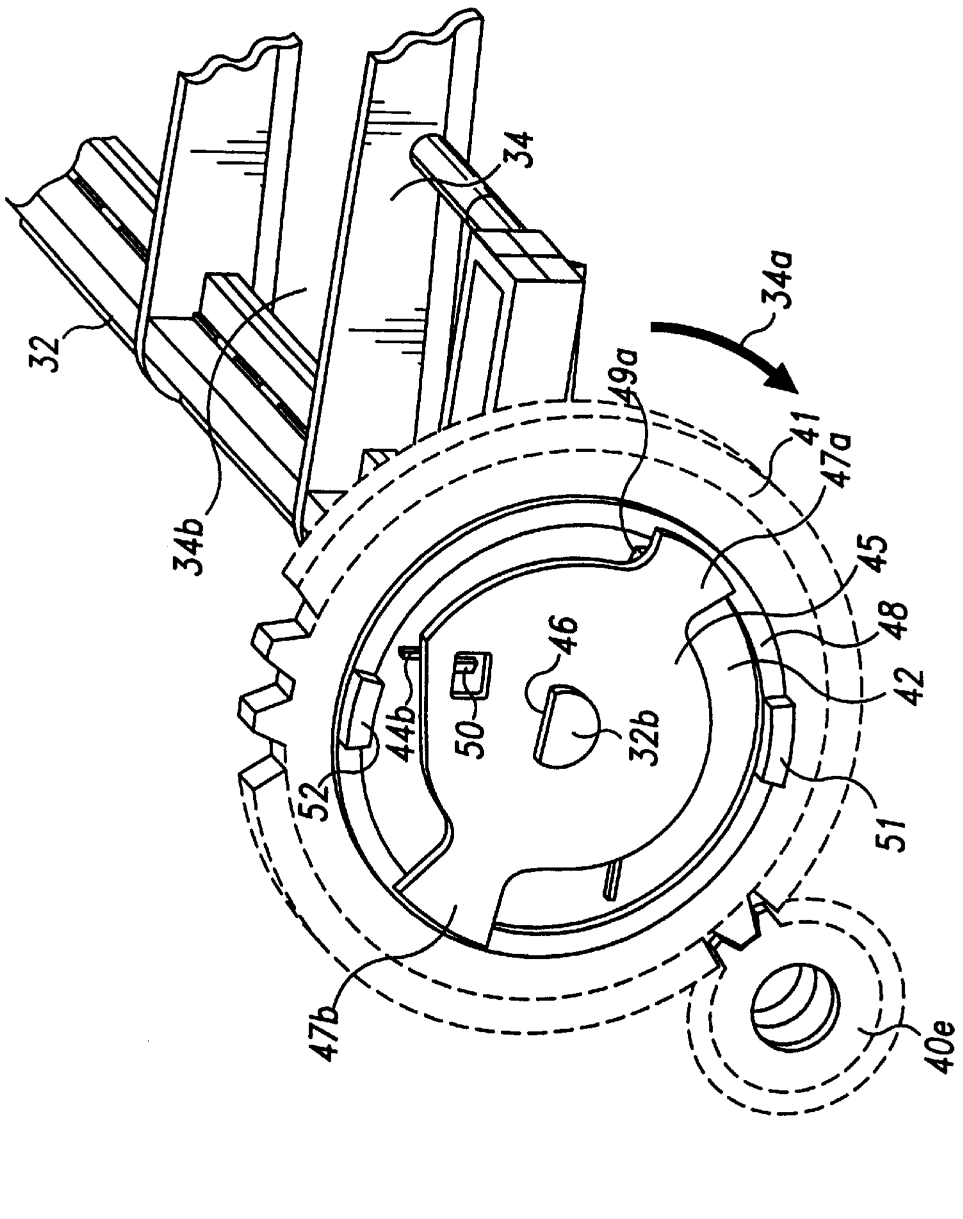
FIG. 5A is a fragmentary view similar to FIG. 4, except illustrating another portion of the torque sensitive coupling for coupling the driven shaft for the agitator/paddle, through the coupling to the drive gear.
Figure 5B:
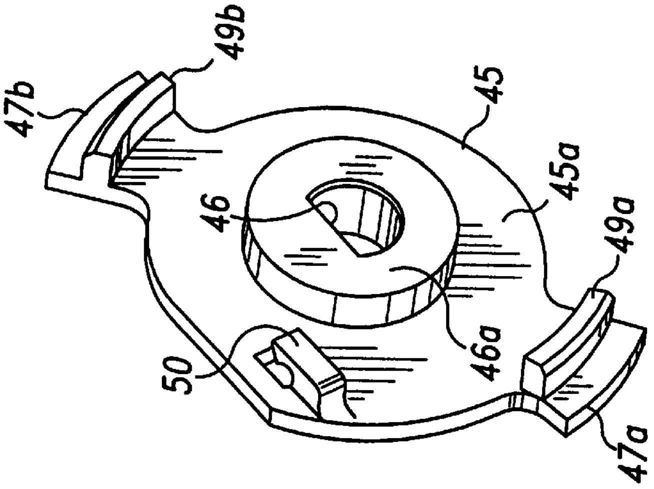
FIG. 5B depicts the reverse side of one-half of the torque sensitive coupling, and that portion which connects to the agitator/paddle shaft.

Turning now to FIG. 5A, the other half (driven half ) of the coupling is illustrated therein. To this end, an arbor 45 having a keyed central opening 46 dimensioned for receiving the keyed (flat) shaft end 32*b* of the shaft 32, is depicted therein. For ease of understanding, an inset drawing is provided wherein the reverse side of the arbor 45 is shown. The arbor 45 includes radially extending ear portions 47*a*, 47*b*, the extended terminal ends of which overlay the flange 48 associated with the web 42 of the gear 41. The rear face or back surface 45*a* of the arbor 45 (see FIG. 5B) confronting the web 42, includes depending, reinforcing leg portions 49*a*, 49*b*. A collar 46*a* abuts the web 42 of the gear 41 and the remaining portion of the arbor 45 spaced from the web 42 of the gear 41. Also attached to the rear of the back surface 45*a* of the arbor 45 is a clip 50 which grasps the free standing leg 44*b* of the spring 44.

Thus one end 44*a* (FIG. 4) of the spring 44 is connected to the web 42 of the gear 41, while the other end 44*b* of the spring 44 is connected to the arbor 45 which is in turn keyed to the shaft 32 mounted for rotation in and through the sump 33 of the cartridge 30. Therefore the gear 41 is connected to the shaft 32 through the spring 44 and the arbor 45. As the gear 41 rotates, the end 44*b* of the spring presses against the catch 50 in the arbor 45 which tends to rotate causing the paddle 34 on the shaft 32 to rotate. When the paddle first engages the toner 35 in the sump 33, the added resistance causes an increase in torsion and the spring 44 tends to wind up thereby causing the encoder wheel 31 to lag the rotational position of the gear 41. Stops 51 and 52 mounted on the flange 48 prevent over winding or excessive stressing of the spring 44. In instances where the sump 33 is at the full design level of toner 35, the ears 47*a*, 47*b* engage the stops 52 and 51 respectively. The spring 44 therefore allows the paddle shaft 32 to lag relative to the gear 41 and the drive train 40 because of the resistance encountered against the toner 35 as the paddle 34 attempts to move through the sump 33. The more resistance encountered because of toner against the paddle 34, the greater the lag. As shall be described in more detail hereinafter, the difference in distance traveled by the gear 41 (really the motor 15*a*) and the encoder wheel 31, as the paddle 34 traverses the sump 33 counter clockwise from the 9:00 position (see FIG. 2,) to about the 5:00 position, is a measure of how much toner 35 remains in the sump 33, and therefore how many pages may yet be printed by the EP machine or printer 10 before the cartridge 30 is low on toner. This measurement technique will be explained more fully with regard to finding the home position of the encoder wheel 31 and reading the wheel.

Figure 6:
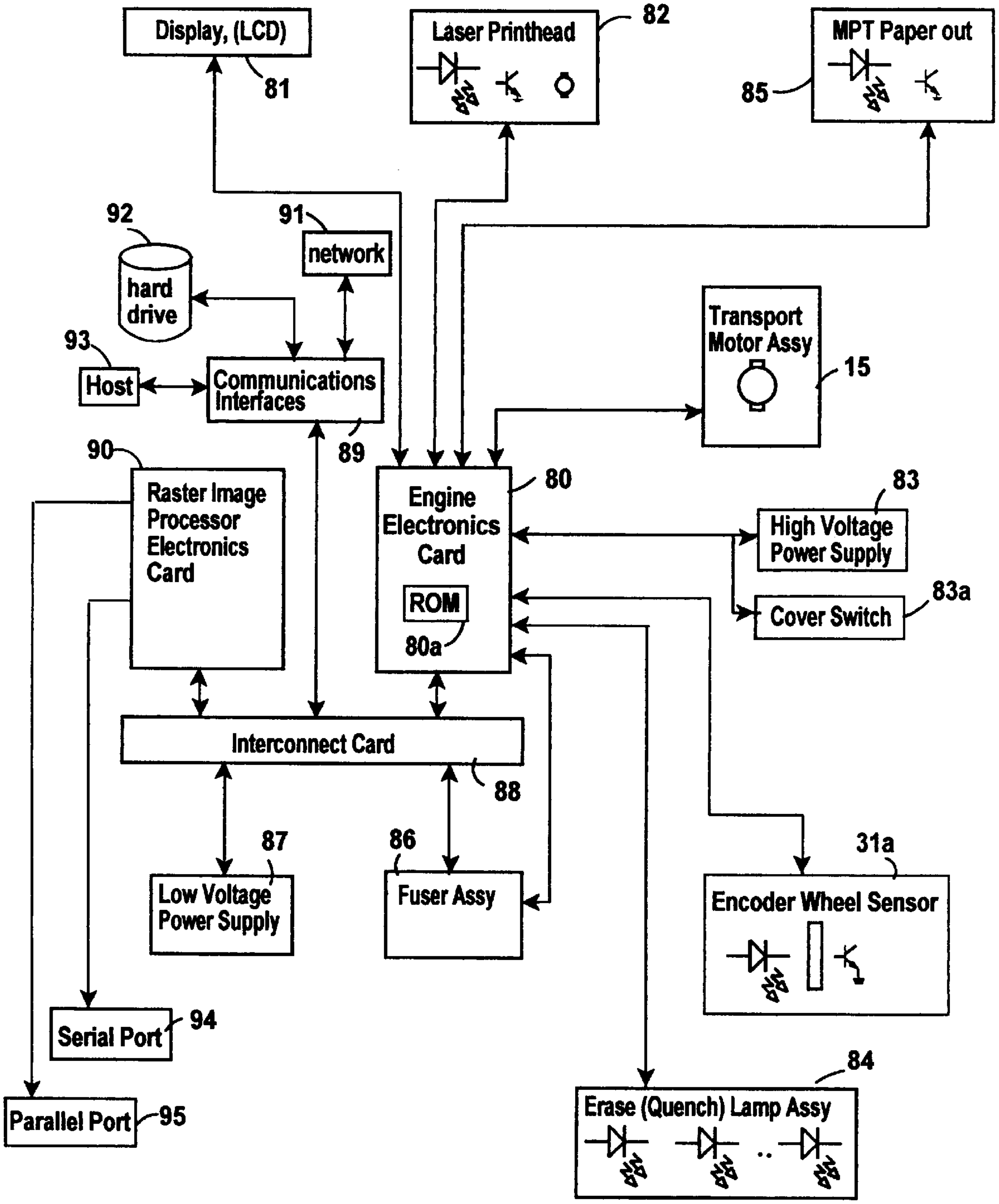
FIG. 6 is a simplified electrical diagram for the machine of FIG. 1, and illustrating the principal parts of the electrical circuit.

Turning now to FIG. 6 which is a simplified electrical diagram for the machine 10, illustrating the principal parts of the electrical circuit thereof, the machine employs two processor (micro-processor) carrying boards 80 and 90, respectively labeled "Engine Electronics Card" and "Raster Image Processor Electronics Card" (hereinafter called EEC and RIP respectively). As is conventional with processors, they include memory, I/O and other accouterments associated with small system computers on a board. The EEC 80, as shown in FIG. 6, controls machine functions, generally through programs contained in the ROM 80*a* on the card and in conjunction with its on-board processor. For example, on the machine, the laser printhead 82; the motor transport assembly 15; the high voltage power supply 83 and a cover switch 83*a* which indicates a change of state to the EEC 80 when the cover is opened; the Encoder Wheel Sensor 31*a* which reads the code on the encoder wheel 31 informing the EEC 80 needed cartridge information and giving continuing data concerning the toner supply in the sump 33 of the EP cartridge 30; a display 81 which indicates various machine conditions to the operator, under control of the RIP when the machine is operating but capable of being controlled by the EEC during manufacturing, the display being useful for displaying manufacturing test conditions even when the RIP is not installed. Other functions such as the Erase or quench lamp assembly 84 and the MPT paper-out functions are illustrated as being controlled by the EEC 80. Other shared functions, e.g., the Fuser Assembly 86 and the Low Voltage Power Supply 87 are provided through an interconnect card 88 (which includes bussing and power lines) which permits communication between the RIP 90 and the EEC 80, and other peripherals. The Interconnect card 88 may be connected to other peripherals through a communications interface 89 which is available for connection to a network 91, non-volatile memory 92 (e.g., hard drive), and of course connection to a host 93, e.g., a computer such as a personal computer and the like.

The RIP primarily functions to receive the information to be printed from the network or host and converts the same to a bit map and the like for printing. Although the serial port 94 and the parallel port 95 are illustrated as being separable from the RIP card 90, conventionally they may be positioned on or as part of the card.

Prior to discussing, via the programming flow chart, the operation of the machine in accordance with the invention, the structure of the novel encoder wheel 31 should be described. To this end, and referring now to FIG. 7, the encoder wheel 31 is preferably disk shaped and comprises a keyed central opening 31*b* for receipt by like shaped end 32*a* of the shaft 32. The wheel includes several slots or windows therein which are positioned preferably with respect to a start datum line labeled D0, for purposes of identification. From a "clock face" view, D0 resides at 6:00, along the trailing edge of a start/home window 54 of the wheel 31. (Note the direction of rotation arrow 34*a*.) The paddle 34 is schematically shown positioned at top-dead-center (TDC) with respect to the wheel 31 (and thus the sump 33). The position of the encoder wheel sensor 31*a*, although stationary and attached to the machine, is assumed, for discussion purposes, aligned with D0 in the drawing and positioned substantially as shown schematically in FIG. 1.

Because the paddle 34 is generally out of contact with the toner in the sump, from the 3:00 position to the 9:00 position (counter clockwise rotation as shown by arrow 34*a*), and the shaft velocity may be assumed to be fairly uniform when the paddle moves from at least the 12:00 (TDC) position to the 9:00 position, information concerning the cartridge 30 is preferably encoded on the wheel between 6:00 and approximately the 9:00 position. To this end, the wheel 31 is provided with radially extending, equally spaced apart, slots or windows 0–6, the trailing edges of which are located with respect to D0 and labeled D1–D7 respectively. Each of the slots 0–6 represents an information or data bit position which may be selectively covered as by one or more decals 96, in a manner to be more fully explained hereinafter with reference to FIG. 10. Suffice at this point that a plurality of apertures 56–59 are located along an arc with the same radius but adjacent the data slots or windows 0–6. Note that the spacing between apertures 56 and 57 is less than the spacing between apertures 58 and 59.

The coded data represented by combinations of covered, not-covered slots 0–6 indicate to the EEC 80 necessary information as to the EP cartridge initial capacity, toner type, qualified or unqualified as an OEM type cartridge, or such other information that is either desirable or necessary for correct machine operation. Adjacent slot 6 is a stop window 55 which has a width equal to the distance between the trailing edges of adjacent slots or windows, e.g., D1=(D2–D1, =D3–D2, etc.)=the width of window 55. Note that window 55 is also spaced from the trailing edge of slot 6 a distance equal to the stop window width 55. That is, the distance D8–D7=twice the window 55 width while the window width of window 55 is greater than the width of the slots 0–6.

Adjacent slot 0, from approximately the 5:00 to the 6:00 position is a start/home window 54. The start/home window 54 is deliberately made larger than any other window width. Because of this width difference, it is easier to determine the wheel position and the start of the data bit presentation to the encoder wheel sensor 31*a*. The reason for this will be better understood when discussing the programming flow charts of FIG. 8A and 8B.

In order to provide information to the EEC 80 as to the lag of the encoder wheel 31 relative to the transport motor 15*a* position (counted increments), three additional slots or windows "a", "b" and "c" are provided at D9, D10 and D11 respectively. The trailing edge of slot "a", (angular distance D9) is 200° from D0; the trailing edge of slot "b" (angular distance D10) is 215° from D0 and the trailing edge of slot "c" (angular distance D11) is 230° from D0. From FIG. 7 it may be seen that when the slot "a" passes the sensor 31*a* at D0, the paddle 34 will have already passed bottom dead center (6:00 position) by 20°, (200°–180°) window or slot "b" by 35° (215°–180°), and slot "c" by 50° (230°–180°). The significance of the placement of the slots "a", "b" and "c" will be more fully explained, hereinafter, with respect to FIG. 9.

Figure 8A:
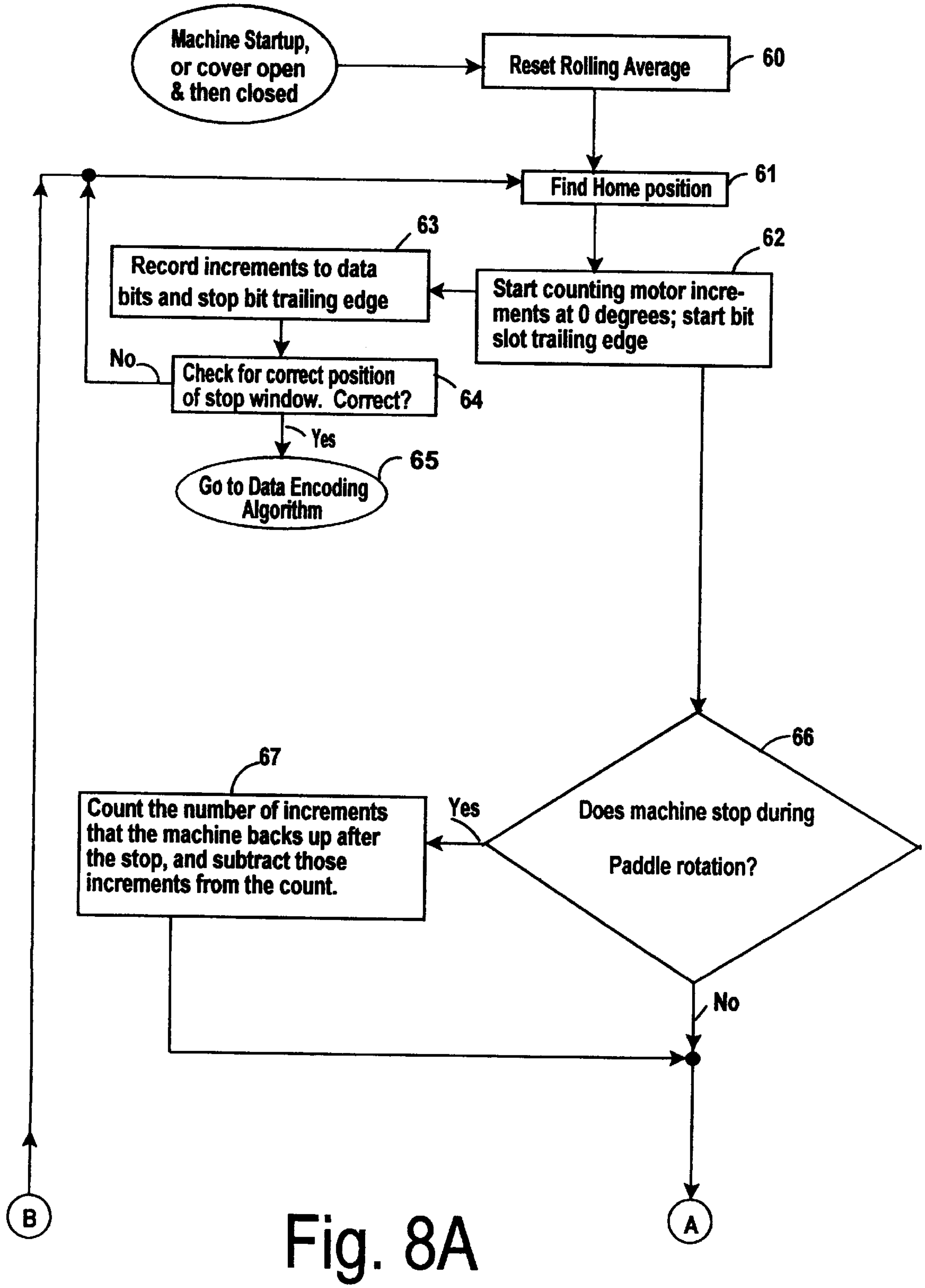
FIG. 8A is a first portion of a flow chart illustrating the code necessary for machine start up, and the reading of information coded on the encoder wheel.
Figure 8B:
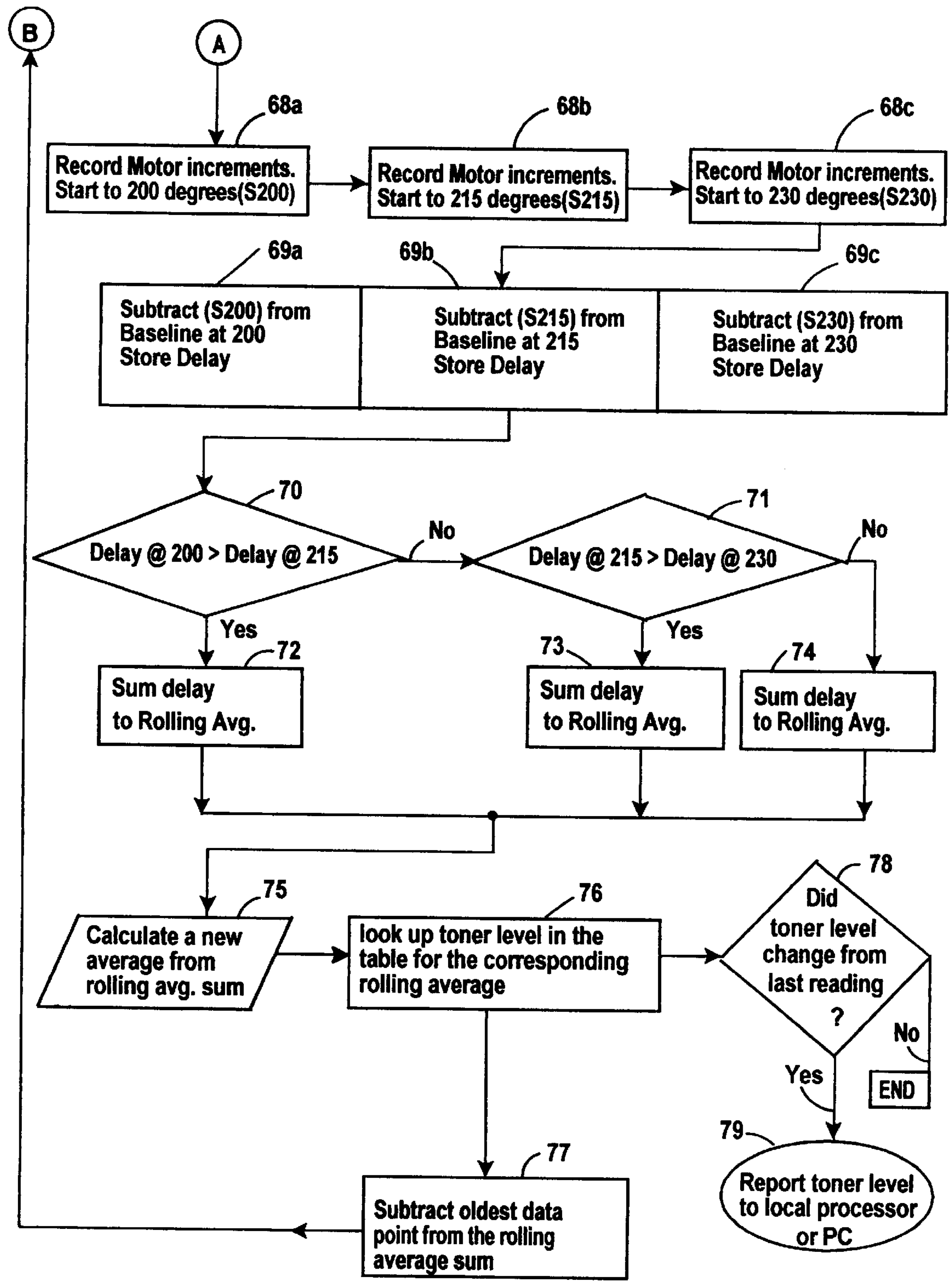
FIG. 8B is a second portion of the flow chart of FIG. 8A illustrating the measurement of toner level in the toner sump.

Referring now to FIGS. 8A and 8B which shows respectively a programming and functional flow chart illustrating the code necessary for machine start up, and the reading of information coded on the encoder wheel, including the measurement of toner 35 level in the toner sump 33. At the outset, it is well that it be understood that there is no reliance on or measurement of the speed of the machine, as it differs depending upon the operation (i.e., resolution, toner type, color, etc.) even though a different table may be required for look up under gross or extreme speed change conditions. Accordingly, rather than store in the ROM 80*a* a norm for each of several speeds to obtain different resolutions to which the actual could be compared to determine the amount of toner left, what is read instead is the angular 'distance' traversed by the encoder wheel 31 referenced to the angular distance traveled by the motor, and then comparing the difference between the two angular measurements to a norm or base-line to determine the amount of toner 35 left in the sump 33. By observation, it can be seen that the distance that the encoder wheel travels between start or home (D0) and "a", "b", "c" is always the same. So what is being measured is the distance the motor has to travel before slot "a" is sensed, slot "b" is sensed and slot "c" is sensed, and then taking the difference as being the measured lag. In essence, and perhaps an easier way for the reader to understand what is being measured, is that the angular displacement of the paddle 34 is being measured with respect to the angular displacement of the gear 41 (gear train 40 as part of transport motor assembly 15). As discussed below, the greatest number (lag number) indicates the paddle position which gives the highest torque (the most resistance). This number indicates which look up table in ROM should be employed and gives a measure of how much toner 35 is left in the sump 33 of the cartridge 30.

Referring first to FIG. 8A, after machine 10 start up or the cover has been opened and later closed, the Rolling Average is reset, as shown in logic block 60. Simply stated, 'n' (e.g., 5 or 6) sample measurements are examined and the average of them is stored and the code on the encoder wheel 31 of the cartridge 30 is read, compared to what was there before, and then stored. The reason for doing this is that if a user replaces an EP cartridge since the last power on or machine 10 startup, there may be a different toner type, toner level etc. in the new sump. Accordingly, so as not to rely on the old data, new data is secured which includes new cartridge data and/or amount of toner 35 remaining in the cartridge 30. Therefore a new 'rolling average' is created in the EEC 80. With regard to host notification, the old data would be reported because the great majority of time when the machine is started up or the cover is closed once opened, a new cartridge will not have been installed, and reliance may usually be placed upon the previous information.

The next logical step at 61 is to 'Find the Home position' of the encoder wheel 31. In order for either the toner level or cartridge characteristics algorithms to operate properly, the "home position" of the wheel 31 must first be found. Necessarily, the EEC 80, through sensor 31*a* must see the start of a window before it begins determining the home or start position of the wheel, since the engine could be stopped in, for instance, the stop window 55 position and due to backlash in the system, the motor may move enough distance before the encoder wheel actually moves that the measured "total window width" could appear to be the start/home window 54. Below is set forth in pseudo code the portion of the program for finding the start/home window 54. As previously discussed, the start/home window 54 is wider than the stop window 55 or for that matter, any other slot or window on the encoder wheel 31.

```
'Find the home window first
'This loop runs on motor "increments"
HomeFound = False
while (! HomeFound)
  If (found the start of a Window) Then
    WindowWidth = 0
    While (not at the end of Window {increment WindowWidth}
      If (WindowWidth > MINIMUM_HOME_WIDTH
    AND WindowWidth < MAXIMUM_HOME_WIDTH) Then
      HomeFound = True
  End if
End While
```

In the above algorithm, 'HomeFound' is set false and a loop is run until the window or slot width meets the conditions of greater than minimum but less than maximum, then 'HomeFound' will be set true and the loop is ended. So the algorithm in essence is articulating: see the window; compare the window with predetermined minimum and maximum widths, for identification; and then indicate that the 'home window' 54 has been found when those conditions are met.

To ensure that the algorithm found home properly, after it identifies the stop window 55, it checks to ensure that the position of the stop window 55 is within reason with respect to the start/home window 54 and of course that the window width is acceptable. This occurs in logic blocks or steps 62, 63 and 64 in FIG. 8A. If this condition is not met, then the configuration information should be taken again. If this check passes, then there is no need to continue to look at the configuration information until a cover closed or power on cycle occurs. This guards against the potential conditions wherein the engine misidentifies the start/home window 54 and thus mischaracterizes the cartridge 30.

Figure 7:
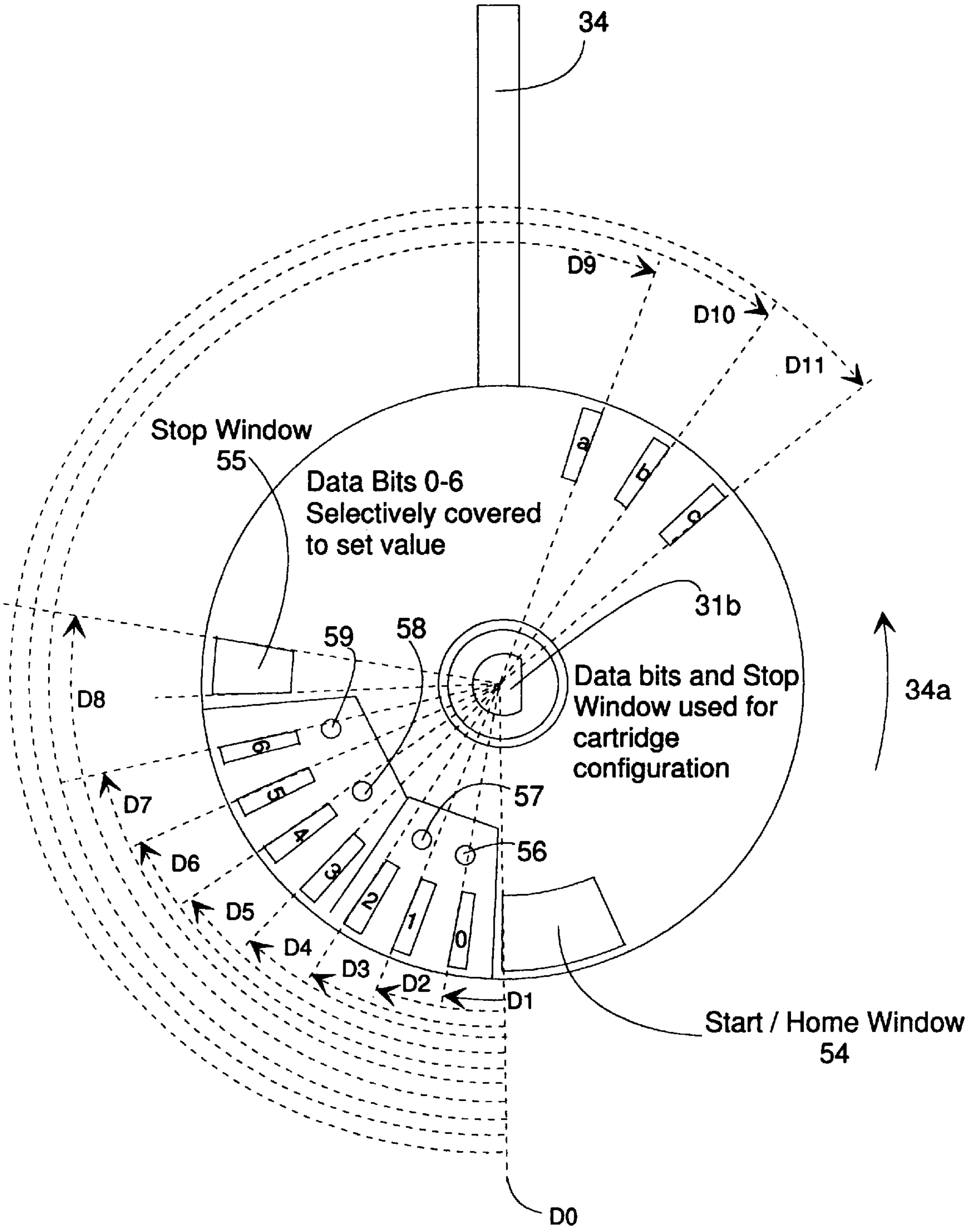
FIG. 7 is an enlarged side elevational view of the encoder wheel employed in accordance with the present invention, and viewed from the same side as shown in FIG. 2, and from the opposite side as shown in FIG. 3.

Prior to discussing the pseudo-code for 'Reading the Wheel', it may be helpful to recall that a portion of the encoder wheel's 31 revolution is close enough to constant velocity to allow that section to be used and read almost as a "windowed bar code". With reference to FIG. 7, that is the section of the wheel 31 from the trailing edge of the start/home window 54 to the trailing edge of the stop window 55 including the slots or windows 0–6. This is preferably in the section of the encoder wheel 31 in which the paddle 34 is not impinging upon or in the toner 35 in the sump 33. Passage of this section over the optical sensor 31*a* creates a serial bit stream which is decoded to gather read-only information about the cartridge. The information contained in this section may comprise information that is essential to the operation of the machine with that particular EP cartridge, or "nice to know" information. The information may be divided, for example into two or more different classifications. One may be cartridge 'build' specific, i.e., information which indicates cartridge size, toner capacity, toner type, photo conductor (PC) drum type, and is personalized when the cartridge is built, the other which may allow for a number of unique "cartridge classes" which may be personalized before cartridge shipment, depending, for example, upon the OEM destination. The latter classification may, for example inhibit the use of cartridges from vendors where it is felt that the cartridge will give inferior print, may have some safety concern, or damage the machine in some way. Alternatively, if the machine is supplied as an OEM unit to a vendor for his own logo, the cartridges may be coded so that his logo cartridge is that which is acceptable to the machine. The selective coding by blocking of the windows may be performed via a stick-on-decal operation which will be more fully explained with reference to FIG. 10.

The 'Find Home' code determines the start/home window 54 and measures the distance corresponding to the trailing edge of each window 0–6 from the trailing edge of the window 54. This acquisition continues until the engine detects the stop window 55 (which is designed to have a greater circumferential width then the data windows 0–6 but less than the start/home window 54). Using a few integer multiplications, the state of each bit in the byte read is set using the recorded distance of each window 0–6 from the trailing edge of the home window 54.

The portion of the program for reading the encoder wheel, in pseudo-code, is as follows:

```
'Find Home' (see above)
'Gather distances for all of the data window
'This loop runs on motor "increments"
Finished = False
WindowNumber = 0
CumulativeCount = 0
while (!Finished)
CumulativeCount = CumulativeCount + 1
If (the start of a window if found) Then
        WindowWidth = 0
        While (not at the end of Window)
           increment WindowWidth
           increment CumulativeCount
        End While
     If (WindowWidth > Minimum Stop window Width
           AND WindowWidth < Maximum Stop Window Width
           AND CumulativeCount > Minimum Stop Position
           AND CumulativeCount < Maximum Stop Position) Then
           'we must ensure that the stop window is really what we found
           Finished = True
           StopDistanceFromHome = CumulativeCount
        Else
           DistanceFromHome(WindowNumber) =CumulativeCount
           WindowNumber = WindowNumber + 1
        End if'check for stop window
        End If'check for start of window
End While
'Now translate measurements into physical bits
DataValue = 0
'First divide the number of samples taken by 9
BitDistance = StopDistanceFromHome/9
For I = 0 To WindowNumber − 1
     BitNumber = DistanceFromHome(I)/BitDistance
        'What is being determined is the bit number corresponding to the
        'measurement by rounding up DistanceFromHome(I)/BitDistance.
     If ((DistanceFromHome(I) − (BitDistance * BitNumber)) * 2 > BitDistance) Then
        BitNumber = BitNumber + 1
     End If
     DataValue = DataValue + 1 (SHIFTLEFT) BitNumber − 1
Next 'Window number
DataValue =~DataValue 'invert result since windows are logic 0's
```

The program depicted above in pseudo code for reading the wheel is quite straight forward. Thus in logic step 63, (FIG. 8A) where the motor increments are recorded for each data bit, and stop bit trailing edge, as was discussed with regard to FIG. 7 that the distances D1–D7 between the trailing edges of windows or slots 0 through 6, are equally spaced. (i.e., D7–D6=some constant "K", D5–D4=constant "K" etc.) The trailing edge of the stop window 55 is also a distance of twice "K" from the trailing edge of slot 6. While the distance from the trailing edge of stop window 55 to its leading edge (i.e., the window 55 width) is equal to one 'bit' distance or "K" from the leading edge, this width may be any convenient distance as long as its' width is>than the width of the slots 0–6 and<the width of the start/home window 54. Thus the line of pseudo code above 'First divide the number of samples taken by 9', (from the trailing edge of the start/home window or slot 54) means that there are 7 bits from D1 through D7, plus two more through D8, and therefore '/9' gives the spacing "K" between the windows (trailing edge of the start/home window 54 to the trailing edge of the stop window 55) which may be compared to what this distance is supposed to be, and in that manner insure that the bit windows 0–6 and stop window 55 have been found. If the stop window 55 is not identified correctly by the technique just described, then a branch from logic step 64 to logic step 61 will once again initiate the code for finding the home position, as in block 61 and described above.

In logic block or step 65, the next logical step in the program is to go to the Data Encoding Algorithm portion of the program. In the pseudo code set forth above, this starts with the REM statement "'Now translate measurements into physical bits". Now, assume that when coded, the encoder wheel 31 has several of the bits 0–6 covered, as by a decal so that light will not pass therethrough. Suppose all data bit slots but 6 and the stop window 55 are covered. A reading of distance D8/9 will give the spacing between the data slots or windows 0–6. Therefore, the distance to slot D7, i.e., the trailing edge of slot 6, will be 7 times "K" (bit spacing) and therefore will indicate that it is bit 7 that is emissive and that the bit representation is 1000000, or if the logic is inverted, 0111111. Notice that the number found is rounded up or down, as the case may be dependent upon such factors as paddle mass, rotational speed etc. In certain instances, this may mean rounding up with a reading above 0.2 and rounding down with a reading below 0.2. E.g., 6.3 would be rounded to 7, while 7.15 would be rounded to a 7.

In logic step 66 the question is asked: "Does the machine stop during paddle rotation?" If it does, logic step 67 is initiated. The reason for this is that if the paddle is stopped, especially when in the portion of the sump 33 containing a quantity of toner 35, in order to release the torsion on the spring 44 the motor 15*a* is backed up several increments. This will allow removal, and/or replacement, if desired, of the EP cartridge 30. This logic step allows for decrementing the number of steps "backed up" from the incremental count of motor increments which was started in logic block 62.

Figure 9:
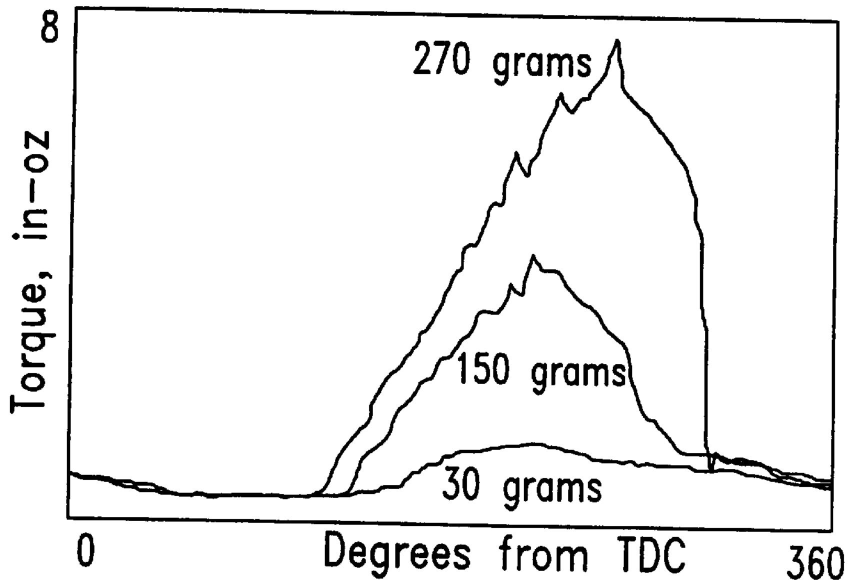
FIG. 9 is a graphical display of the torque curves for three different toner levels within the sump, and at various positions of the toner paddle relative to top dead center or the home position of the encoder wheel.

Turning now to FIG. 8B, as the encoder wheel 31 rotates, the paddle 34 enters the toner 35 in the sump 33. As described above relative to logic step 62, the motor increments are counted. The motor increments are then recorded as S200, S215 and S230, in logic step 68*a*, 68*b* and 68*c* at the trailing edges of slots "a", "b", and "c" respectively of the wheel 31. These numbers, S200, S215 and S230 are subtracted from the baseline of what the numbers would be absent toner 35 in the sump 33, (or any other selected norm) which is then directly indicative of the lag due to resistance of the toner in the sump, with the paddle 34 in three different positions in the sump. This is shown in logic steps 69*a*–69*c* respectively. As has previously been stated, there is a correlation between load torque on the toner paddle 34 and the amount of toner 35 remaining in the toner supply reservoir or sump 33. FIG. 9 illustrates this relationship. In FIG. 9, torque is set in inch-ounces on the ordinate and degrees of rotation of the paddle 34 on the abscissa.

Referring briefly to FIG. 9, several characteristics of this data stand out as indicating the amount of toner remaining. The first one is the peak magnitude of the torque. For example, with 30 grams of toner 35 remaining in the sump 33, the torque is close to 2 inch-ounce while at 150 grams the torque approximates 4 inch-ounces and at 270 grams the torque approximates 8 inch-ounces. The second characteristic is that the location of the peak of the torque curve does not move very much as the amount of toner changes. This suggests that measuring the torque near the location where the peak should occur could provide a measure of remaining toner. That is why, as shown in FIG. 7, the trailing edge of slot "a", (distance D9) is 200° from D0; the trailing edge of slot "b" (distance D10) is 215° from D0 and the trailing edge of slot "c" (distance D11) is 230° from D0. Another obvious indicator is the location of the onset of the torque load. Yet a third indicator is the area under the torque curves.

Another way of looking at this process is that while the angular distance measurements of D9, D10 and D11 are known, the number of increments the motor has to turn in order that the resistance is overcome as stored in the torsion spring 44, is the difference in distance the motor has to travel (rotational increments) to obtain a reading at window "a", then "b" and then "c". The delay is then compared as at logic step 70 and 71, and the largest delay is summed as at logic steps 72, 73 or 74 to the rolling average sum.

Thereafter a new average calculation is made from the rolling average sum. This is shown in logic step 75. As illustrated in logic block 76, the toner 35 level in the sump 33 may then be determined from a look up table precalculated and stored in the ROM 80*a* associated with the EEC 80 in accordance with the new rolling average.

In logic block 77, the oldest data point is subtracted from the rolling average sum and then the rolling average sum is reported for use back to logic block 61 (Find Home position). If the toner level changed from the last measurement, as in compare logic block 78, this condition may be reported to the local RIP processor 90 and/or the host machine, e.g., a personal computer as indicated in logic block 79.

Coding of the encoder wheel 31 is accomplished, as briefly referred to above, by covering selected ones of slots 0–6 with a decal. For customization for an OEM vendee, and in order to reduce inventory, and in accordance with another feature of the invention, the problem of quickly and accurately applying such a decal to the correct area of the wheel 31, even under circumstances of limited space, is provided. Due to the close spacing of the slots 0–6 in the encoder wheel 31, a pre-cut, preferably adhesive backed decal 96 is employed to selectively cover pre-selected slots depending on how the decal is cut or stamped. Very accurate positioning of the decal 96 is achieved by use of alignment pins in conjunction with an alignment tool 100. Because another decal can be placed on another region of the wheel, the spacing of the alignment holes 56–59 on the encoder wheel 31 is different in each region.

Figure 10:
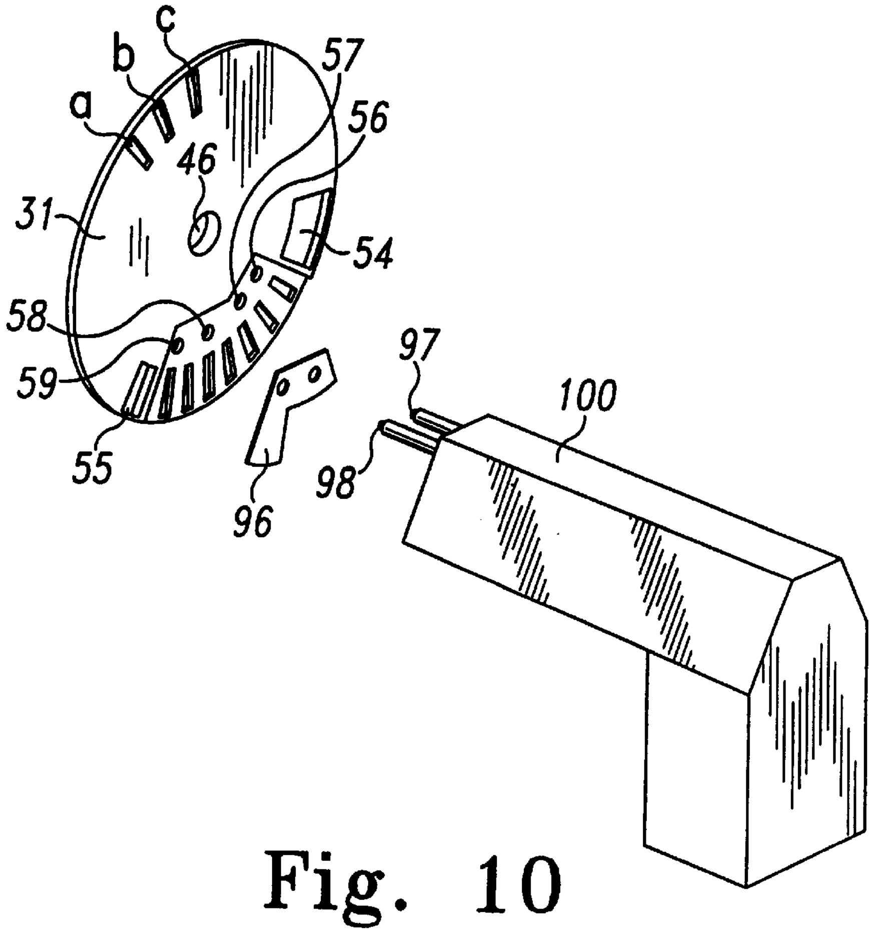
FIG. 10 is a perspective view of an encoder wheel with novel apparatus for blocking off selected slots in the encoder wheel for coding the wheel with EP cartridge information.

To this end, as previously discussed, there are two pairs of apertures in the encoder wheel or disk, adjacent the slots, the apertures of one of the pairs 58, 59 being spaced apart a greater distance than the apertures 56–57 of the other of the pairs. Referring now to FIG. 10, a decal 96 is sized to fit over at least one of the slots 0–2, or 3–6 to cover the same. As illustrated, the decal 96 has spaced apart apertures therein corresponding to one of the pairs of apertures, i.e., 58, 59 or 56, 57. A tool 100 has a pair of pins 97, 98 projecting therefrom and corresponding to the spacing of one of the pairs of apertures, whereby when the apertures in the decal are mated with the projecting pins of the tool, the projecting pins of the tool may be mated with the one pair of apertures in the encoder wheel or disk to thereby accurately position the decal over the selected slot in the disk. The decal 96 is installed on the tool with the adhesive side facing away from the tool. The tool 100 is then pushed until the decal 96 makes firm contact with the surface of the wheel.

If the pins 97 and 98 are spaced equal to the spacing between apertures 56 and 57, the decal cannot, once on the tool 100, be placed covering slots associated with the incorrect apertures 58 and 59. The opposite condition is also true. Accordingly, two such tools 100 with different pin 97, 98 spacing may be provided to insure proper placement of the correct decal for the proper slot coverage. Alternatively, a single tool 100 with an extra hole for receipt of a transferred pin to provide the correct spacing, may be provided.

This method of selective bit blocking is preferred because the process is done at the end of the manufacturing line where less than all of the wheel 31 may be exposed. Use of this tool 100 with differing spaced apart pins allows the operator to get to the encoder wheel 31 easily and prevents misplacement of the decal.

Thus, the present invention provides a simple yet effective method and apparatus for transmitting to a machine of a type employing toner, information concerning the characteristics of an EP cartridge, but also combines with such information continuing data relating to the amount of toner left in the cartridge during machine operation. In this connection the present invention provides suitable software to automatically determine, upon machine power-on-reset (POR) or other resumption of functions, whether conditions have changed or altered since the last period of running of the machine, and to alter the machine running conditions in view of those determinations or findings. Moreover, the present invention provides a simplified, but effective method and means for changing the initial information concerning the cartridge, which means and method is accurate enough and simple enough to allow for either in field alterations or end of manufacturing coding of the EP cartridge. The present invention provides, in a single encoder wheel associated with the supply EP cartridge, information which is essential for proper and efficient operation of the machine but which also provides on-going information concerning the amount of toner left in the cartridge for continued use.

Although the invention has been described with a certain degree of particularity, it should be recognized that elements thereof may be altered by persons skilled in the art with out departing from the spirit and scope of the invention as hereinafter set forth in the following claims.

What is claimed is:

1. An apparatus for configuring an encoder plate associated with a cartridge for an electrophotographic machine, wherein said encoder plate conveys cartridge characteristic information to said machine when said cartridge is installed in said machine, said encoder plate having a plurality openings, wherein an opened or closed status of said plurality of openings represent said cartridge characteristic information, said apparatus comprising:

a material; and a tool for applying said material to said plate for selectively covering one or more of said plurality of openings.

2. The apparatus of claim 1, wherein said tool comprises a plurality of pins for selectively mating in corresponding guide apertures located in said encoder plate.

3. The apparatus of claim 2, wherein said material comprises a decal sized to cover at least one of said plurality of openings, said decal having spaced apart alignment apertures therein corresponding to a spacing between said corresponding guide apertures.

4. The apparatus of claim 2, wherein said encoder plate includes two pairs of guide apertures, adjacent at least some of said plurality of openings, the guide apertures of one of said two pairs being spaced apart a greater distance than the guide apertures of the other of said two pairs.

5. The apparatus of claim 4, wherein said plurality of pins correspond to the spacing between said one of said two pairs of guide apertures, whereby when said guide apertures are mated with corresponding ones of said plurality of pins, said material is accurately positioned and applied over at least one opening in said encoder plate.

6. The apparatus of claim 1, wherein said material comprises a decal sized to cover at least one of said plurality of openings.

7. A method for programming an encoder plate having a plurality openings, wherein an opened or closed status of said plurality of openings represent cartridge characteristic information, said method comprising the steps of:

providing a material; and applying said material to said encoder plate for selectively covering one or more of said plurality of openings.

8. The method of claim 7, further comprising the step of accurately positioning said material in relation to said encoder plate by providing a tool having a plurality of pins for selectively mating in corresponding guide apertures located in said encoder plate.

9. The method of claim 8, wherein said plurality of pins have a spacing corresponding to a spacing between a corresponding plurality of said guide apertures.

10. The method of claim 8, wherein said material comprises a decal sized to cover at least one of said plurality of openings, said decal having spaced apart alignment apertures therein correspondingly receiving said plurality of pins.

11. A method for programming an encoder plate having a plurality openings, wherein an opened or closed status of said plurality of openings represent cartridge characteristic information, said method comprising the steps of:

providing a plurality of guide apertures in said encoder plate;

providing a tool having a plurality of pins for selectively mating in corresponding guide apertures in said encoder plate, loading said tool with a material;

engaging said plurality of pins of said tool in said corresponding guide apertures in said encoder plate; and manipulating said tool to apply said material to said encoder plate for selectively covering one or more of said plurality of openings.

12. The method of claim 11, wherein said material comprises a decal sized to cover at least one of said plurality of openings.

* * * * *